US011325992B2

(12) United States Patent
Yoshida et al.

(10) Patent No.: US 11,325,992 B2
(45) Date of Patent: May 10, 2022

(54) METHOD FOR MANUFACTURING WHITE FINE PARTICLE DISPERSION

(71) Applicant: KAO CORPORATION, Tokyo (JP)

(72) Inventors: Tomohide Yoshida, Nakayama (JP); Yasufumi Ueda, Nakayama (JP)

(73) Assignee: KAO CORPORATION, Tokyo (JP)

(*) Notice: Subject to any disclaimer, the term of this patent is extended or adjusted under 35 U.S.C. 154(b) by 382 days.

(21) Appl. No.: 16/473,186

(22) PCT Filed: Dec. 22, 2017

(86) PCT No.: PCT/JP2017/046228
§ 371 (c)(1),
(2) Date: Jun. 24, 2019

(87) PCT Pub. No.: WO2018/123902
PCT Pub. Date: Jul. 5, 2018

(65) Prior Publication Data
US 2019/0352434 A1 Nov. 21, 2019

(30) Foreign Application Priority Data
Dec. 27, 2016 (JP) .............................. JP2016-253410

(51) Int. Cl.
C09D 11/106 (2014.01)
C09D 11/322 (2014.01)
C09D 11/326 (2014.01)
C09D 17/00 (2006.01)
C08F 2/44 (2006.01)
C08F 212/08 (2006.01)
C08F 220/06 (2006.01)
C08K 9/10 (2006.01)
B41J 2/01 (2006.01)
C08F 2/06 (2006.01)
C08K 5/37 (2006.01)
C08K 9/06 (2006.01)
C08K 3/22 (2006.01)

(52) U.S. Cl.
CPC .................. C08F 2/44 (2013.01); B41J 2/01 (2013.01); C08F 2/06 (2013.01); C08F 212/08 (2013.01); C08F 220/06 (2013.01); C08K 5/37 (2013.01); C08K 9/06 (2013.01); C09D 11/322 (2013.01); C09D 11/326 (2013.01); C09D 17/001 (2013.01); C09D 17/008 (2013.01); C08K 2003/2241 (2013.01)

(58) Field of Classification Search
CPC ........ C08F 2/44; C09D 11/322; C09D 11/106
See application file for complete search history.

(56) References Cited

U.S. PATENT DOCUMENTS

| 5,431,956 A * | 7/1995 | Robb ................... C08F 292/00 427/220 |
| 9,205,033 B2 | 12/2015 | Shinagawa |
| 2005/0282946 A1 | 12/2005 | Lin et al. |
| 2008/0255281 A1 | 10/2008 | Lin et al. |
| 2008/0268250 A1 | 10/2008 | Hawkett et al. |
| 2008/0314292 A1 | 12/2008 | Shimanaka et al. |
| 2009/0253853 A1 | 10/2009 | Lin et al. |
| 2013/0136848 A1 | 5/2013 | Hawkett et al. |
| 2014/0011943 A1 | 1/2014 | Bardman et al. |
| 2014/0249248 A1* | 9/2014 | Lee ...................... C09D 11/326 523/206 |
| 2017/0333942 A1 | 11/2017 | Hawkett et al. |

FOREIGN PATENT DOCUMENTS

| CN | 104345553 A | 2/2015 | |
| EP | 392065 A1 * | 10/1990 | ............ C08F 292/00 |
| JP | 2006-37080 A | 2/2006 | |
| JP | 2006-096930 A | 4/2006 | |
| JP | 2006-96930 A | 4/2006 | |
| JP | 2008-516017 A | 5/2008 | |
| JP | 2009-024165 A | 2/2009 | |
| JP | 2012-002978 A | 1/2012 | |
| JP | 2013-203975 A | 10/2013 | |
| JP | 2014-515765 A | 7/2014 | |

OTHER PUBLICATIONS

Technical Data Sheet of Dispex GA40 from BASF. (Year: 2010).*

(Continued)

Primary Examiner — Nu A Nguyen
(74) Attorney, Agent, or Firm — Birch Stewart Kolasch & Birch, LLP

(57) ABSTRACT

The present invention relates to a process for producing a dispersion of white fine particles from which a white ink that is capable of exhibiting excellent hiding power, rub fastness and water resistance even when printed on a low-water absorbing printing medium can be obtained by incorporating the dispersion of the white fine particles into the ink, and a water-based ink for ink-jet printing which contains the white fine particles. The present invention provides [1] a process for producing a dispersion of white fine particles, including step 1 of mixing titanium oxide and a polymer dispersant at a pH value that is not less than an acid dissociation exponent (pKa) of at least a part of an acid component of the polymer dispersant to thereby obtain a titanium oxide dispersion, in which an isoelectric point (A) of the titanium oxide and the acid dissociation exponent (pKa) (B) of the polymer dispersant satisfy a relationship represented by the formula: A−B≥0, the polymer dispersant contains a constitutional unit derived from a hydrophobic monomer, and a volume median particle size ($D_{50}$) of particles in the titanium oxide dispersion is from 150 to 500 nm; and step 2 of adding a polymerizable monomer to the titanium oxide dispersion obtained in the step 1 to subject the polymerizable monomer to polymerization reaction, thereby obtaining the dispersion of the white fine particles, and [2] a water-based ink for ink-jet printing which contains the white fine particles obtained above.

18 Claims, No Drawings

(56) References Cited

OTHER PUBLICATIONS

Preocanin and Kallay, Croatica Chemica Acta CCACAA 79 (1), 95-106 (2006).*
European Patent Office Communication and extended search report issued in the corresponding European Patent Application No. 17889141.2 dated Jul. 23, 2070.
International Search Report for PCT/JP2017/046228 (PCT/ISA/210) dated Feb. 20, 2018, with English translation.
Nguyen et al., "Pigment Encapsulation by Emulsion Polymerization Using Macro-RAFT Copolymers", Langmuir, vol. 24, No. 5, 2008, pp. 2140-2150.
Hongfa Zhu et al., "Formulation and Manufacturing of Fine Chemical Products," JinDun Press, vol. 6, 1st Edition, Nov. 2000, p. 103, 3 pages total.

* cited by examiner

METHOD FOR MANUFACTURING WHITE FINE PARTICLE DISPERSION

FIELD OF THE INVENTION

The present invention relates to a process for producing a dispersion of white fine particles, and a water-based ink for ink-jet printing containing the white fine particles.

BACKGROUND OF THE INVENTION

In ink-jet printing methods, droplets of ink are directly projected onto a printing medium from very fine nozzles and allowed to adhere to the printing medium to obtain printed materials on which characters or images are printed. The ink-jet printing methods need no printing plate unlike the conventional printing methods. Therefore, it has been expected that the ink-jet printing methods can be used in extensive applications as on-demand printing methods that are adaptable for production of a small number and various kinds of prints. In particular, in recent years, there is an increasing demand for not only printed materials using a conventional printing paper having a white ground, but also commercial printed materials using a printing medium having a non-white ground, such as a corrugated board, a paper board, a resin film, etc.

In printing technologies using a printing medium including a low-liquid absorbing coated paper such as an offset coated paper or a non-liquid absorbing resin film such as a polyvinyl chloride resin film, a polypropylene resin film, a polyester resin film, etc., it is known that characters or images printed on the printing medium tend to be deteriorated in rub fastness in an early stage of printing or after being dried owing to slow absorption or no absorption of liquid components of the ink. Therefore, it has been required to improve the printing technologies. In addition, in the application fields of film printing and textile printing, there is an increasing demand for printed materials having very high water resistance.

When producing printed materials using the printing medium having a non-white ground, a white ink is used for the purpose of expressing a white color or enhancing visibility of characters or images printed by colors other than a white color. As a pigment for the white ink, titanium oxide that is an inorganic pigment having high hiding power has been generally used, and a polymer dispersant has been used therein for the purpose of improving dispersibility of the titanium oxide in the ink.

In Brian S. Hawkett et al., Langmuir 2008, 24, 2140-2150, "Pigment Encapsulation by Emulsion Polymerization Using Macro-RAFT Copolymers" (Non-Patent Literature 1), there are disclosed white fine particles formed by encapsulating titanium oxide with a polymer.

JP 2009-24165A (Patent Literature 1) discloses a polymer dispersant that is constituted of an aromatic and/or heterocyclic vinyl monomer unit, an acid group-containing monomer unit, a (meth)acrylic acid ester monomer unit and a monomer unit containing a polyalkylene glycol chain having a specific molecular weight or a chain of a monoalkyl ether of the polyalkylene glycol, and has a specific acid value and a specific molecular weight. In Examples of the Patent Literature 1, it is described that titanium oxide, etc., is used as a pigment, and a pigment dispersion obtained by mixing and dispersing the polymer dispersant together with water and the pigment can be used as a colorant for an aqueous coating material, an aqueous gravure ink, an aqueous ink-jet ink, etc.

JP 2006-96930A (Patent Literature 2) relates to a pigment ink composition that can be used for producing a printed material that is excellent in dispersibility of pigment particles, color developability, rub fastness, etc., and discloses such an ink composition that contains encapsulated titanium oxide colloid particles and encapsulated pigment particles which both are coated with a polymer material. In the Patent Literature 2, it is described that the titanium oxide colloid particles contained in the ink composition are produced by mixing a titanium oxide colloid having a positive charge on a surface thereof and at least one anionic polymerizable surfactant to prepare an aqueous mixture, and further adding at least one polymerizable monomer as well as at least one anionic or cationic polymerizable surfactant to the aqueous mixture, followed by subjecting the resulting mixture to polymerization.

SUMMARY OF THE INVENTION

The present invention relates to the following aspects [1] and [2].

[1] A process for producing a dispersion of white fine particles, including the following steps 1 and 2:

Step 1: mixing titanium oxide and a polymer dispersant at a pH value that is not less than an acid dissociation exponent (pKa) of at least a part of an acid component of the polymer dispersant to thereby obtain a titanium oxide dispersion, in which an isoelectric point (A) of the titanium oxide and the acid dissociation exponent (pKa) (B) of the polymer dispersant satisfy a relationship represented by the formula:

$$A - B \geq 0,$$

the polymer dispersant contains a constitutional unit derived from a hydrophobic monomer, and a volume median particle size ($D_{50}$) of particles in the titanium oxide dispersion is not less than 150 nm and not more than 500 nm; and Step 2: adding a polymerizable monomer to the titanium oxide dispersion obtained in the step 1 to subject the polymerizable monomer to polymerization reaction, thereby obtaining the dispersion of the white fine particles.

[2] A water-based ink for ink-jet printing which contains the white fine particles produced by the process as described in the above aspect [1].

DETAILED DESCRIPTION OF THE INVENTION

The pigment dispersion of the Patent Literature 1 and the encapsulated titanium oxide colloid particles of the Patent Literature 2 both tend to be poor in extent of coating a surface of the titanium oxide with the polymer, and therefore the resulting inks tend to be insufficient in hiding power, rub fastness and water resistance.

In the Non-Patent Literature 1, it has been reported that the pigment is encapsulated by emulsion polymerization, but there is no description concerning ink. In the Non-Patent Literature 1, it is described that a carboxylic acid-based polymer dispersant is used for the titanium oxide that is surface-treated with alumina/zirconia, and therefore the extent of coating the surface of the titanium oxide with the polymer tends to be deteriorated. For this reason, if the encapsulated pigment is used in an ink for ink-jet printing, the resulting ink tends to be insufficient in hiding power, rub fastness and water resistance when printed on a printing medium.

The present invention relates to a process for producing a dispersion of white fine particles from which a white ink that is capable of exhibiting excellent hiding power, rub fastness and water resistance even when printed on a low-water absorbing printing medium can be obtained by incorporating the white fine particles thereinto, and a water-based ink for ink-jet printing which contains the white fine particles.

The present inventors have found that in the process for producing a dispersion of white fine particles which includes the steps of mixing titanium oxide and a polymer dispersant to obtain a dispersion of the titanium oxide and then further adding a polymerizable monomer to the obtained titanium oxide dispersion, when providing the step of mixing the titanium oxide and the polymer dispersant that contains a constitutional unit derived from a hydrophobic monomer under such a condition that an isoelectric point of the titanium oxide is larger than an acid dissociation exponent (pKa) of an acid component of the polymer dispersant to thereby obtain the titanium oxide dispersion, a water-based white ink containing the resulting white fine particles is excellent in hiding power, rub fastness and water resistance.

That is, the present invention relates to the following aspects [1] and [2].

[1] A process for producing a dispersion of white fine particles, including the following steps 1 and 2:

Step 1: mixing titanium oxide and a polymer dispersant at a pH value that is not less than an acid dissociation exponent (pKa) of at least a part of an acid component of the polymer dispersant to thereby obtain a titanium oxide dispersion, in which an isoelectric point (A) of the titanium oxide and the acid dissociation exponent (pKa) (B) of the polymer dispersant satisfy a relationship represented by the formula:

$$A-B \geq 0,$$

the polymer dispersant contains a constitutional unit derived from a hydrophobic monomer, and a volume median particle size ($D_{50}$) of particles in the titanium oxide dispersion is not less than 150 nm and not more than 500 nm; and Step 2: adding a polymerizable monomer to the titanium oxide dispersion obtained in the step 1 to subject the polymerizable monomer to polymerization reaction, thereby obtaining the dispersion of the white fine particles.

[2] A water-based ink for ink-jet printing which contains the white fine particles produced by the process as described in the above aspect [1].

In accordance with the present invention, it is possible to provide a process for producing a dispersion of white fine particles from which a white ink that is capable of exhibiting excellent hiding power, rub fastness and water resistance even when printed on a low-water absorbing printing medium can be obtained by incorporating the white fine particles thereinto, and a water-based ink for ink-jet printing which contains the white fine particles.

[Process for Producing Dispersion of White Fine Particles]

The process for producing a dispersion of white fine particles according to the present invention includes the following steps 1 and 2:

Step 1: mixing titanium oxide and a polymer dispersant at a pH value that is not less than an acid dissociation exponent (pKa) of at least a part of an acid component of the polymer dispersant to thereby obtain a titanium oxide dispersion, in which an isoelectric point (A) of the titanium oxide and the acid dissociation exponent (pKa) (B) of the polymer dispersant satisfy a relationship represented by the formula:

$$A-B \geq 0,$$

the polymer dispersant contains a constitutional unit derived from a hydrophobic monomer, and a volume median particle size ($D_{50}$) of particles in the titanium oxide dispersion is not less than 150 nm and not more than 500 nm; and Step 2: adding a polymerizable monomer to the titanium oxide dispersion obtained in the step 1 to subject the polymerizable monomer to polymerization reaction, thereby obtaining the dispersion of the white fine particles.

When incorporating the white fine particles produced by the process of the present invention into a water-based ink and printing characters or images on a printing medium using the water-based ink, the resulting printed characters or images are capable of exhibiting excellent high hiding power, rub fastness and water resistance even when printed on a low-water absorbing printing medium. The reason why the aforementioned advantageous effects can be attained by the present invention is considered as follows though it is not clearly determined yet.

In the process for producing the dispersion of the white fine particles according to the present invention, the titanium oxide and the polymer dispersant containing a constitutional unit derived from a hydrophobic monomer are first mixed with each other to obtain the titanium oxide dispersion (step 1), and then the polymerizable monomer is further added to the thus obtained titanium oxide dispersion to subject the polymerizable monomer to (seed) polymerization reaction, so that it is possible to encapsulate the titanium oxide with a polymer component (step 2).

In the step 1, the volume median particle size ($D_{50}$) of particles in the resulting titanium oxide dispersion is from 150 to 500 nm, and the isoelectric point (A) of the titanium oxide and the acid dissociation exponent (pKa) (B) of at least a part of an acid component of the polymer dispersant satisfy a relationship represented by the formula: $A-B \geq 0$. By conducting the step 1 under the aforementioned conditions, it is possible to coat the surface of the titanium oxide with the polymer dispersant in a sufficient and efficient manner. After that, the (seed) polymerization is further conducted to firmly encapsulate the titanium oxide with the polymer component. As a result, the surface of the titanium oxide is sufficiently covered with the polymer component, and it is therefore considered that a quantity of titanium atoms exposed to the surface of the resulting respective fine particles is very small, and the resulting dispersion of the white fine particles is excellent in dispersibility.

The resulting dispersion of the white fine particles containing the titanium oxide contains particles having a specific volume median particle size ($D_{50}$), and can be uniformly distributed in the form of a thin layer over a printing medium by a printing means such as an ink-jet printing method, etc. As a result, it is considered that the obtained ink can be enhanced in hiding power rate. In addition, it is considered that since the titanium oxide can be improved in dispersibility, it is possible to incorporate a lager amount of the titanium oxide than that added conventionally into a water-based ink while suppressing increase in viscosity of the resulting water-based ink owing to addition of the titanium oxide thereto, so that the resulting printed material is free from unevenness or mottling on a printing medium, and can further exhibit excellent hiding power, rub fastness and water resistance.

Meanwhile, the term "low-water absorbing" as used in the present specification means a concept that includes both of low-liquid absorbing properties and non-liquid absorbing properties. Also, the term "printing" as used herein means a concept that includes printing or typing for printing characters or images, and the term "printed material" as used herein means a concept that includes printed matters or typed materials on which characters or images are printed.

In addition, the term "water-based" as used herein means that water has a largest content among components of a dispersing medium contained in the ink.

<Titanium Oxide>

The white fine particles and the water-based ink for ink-jet printing (hereinafter also referred to merely as a "water-based ink" or an "ink") according to the present invention contain titanium oxide.

The particle shape of the titanium oxide is not particularly limited, and may be a granular shape, an acicular shape, etc. The average primary particle size of the titanium oxide is preferably not less than 40 nm, more preferably not less than 100 nm, even more preferably not less than 150 nm and further even more preferably not less than 200 nm from the viewpoint of improving whiteness of the resulting white fine particles, and is also preferably not more than 400 nm, more preferably not more than 350 nm and even more preferably not more than 300 nm from the viewpoint of improving hiding power of the resulting white fine particles.

Meanwhile, the average primary particle size of the titanium oxide as used herein means an arithmetic mean value of major axis diameters of primary particles of the titanium oxide, and may be measured by the method described in Examples below.

Examples of a crystal structure of the titanium oxide includes a rutile type (tetragonal system) structure, an anatase type (tetragonal system) structure and a brookite type (orthorhombic system) structure. Among the titanium oxides having these crystal structures, from the viewpoint of attaining good stability, hiding power and availability of crystals of the titanium oxide, the rutile-type titanium oxide is preferably used in the present invention.

The titanium oxide may be produced by either a gas phase method or a liquid phase method. From the viewpoint of facilitating production of the titanium oxide having high crystallinity, the titanium oxide produced by a gas phase method is more preferably used.

The titanium oxide may be in the form of an untreated titanium oxide. However, the titanium oxide is preferably in the form of a surface-treated titanium oxide from the viewpoint of attaining good dispersibility of the titanium oxide. Examples of the surface treatment of the titanium oxide include a surface treatment with an inorganic material, a surface treatment with an organic material such as a titanium coupling agent, a silane coupling agent and a silicone oil, and the like. Among these surface treatments, the surface treatment with an inorganic material is preferred.

As the method for surface-treating the titanium oxide with an inorganic material, there may be mentioned a method for surface-treating the titanium oxide with at least one inorganic material selected from the group consisting of alumina ($Al_2O_3$), silica ($SiO_2$), zinc oxide (ZnO), zirconia ($ZrO_2$), magnesium oxide (MgO) and the like.

From the viewpoint of reducing exposure of a titanium atom onto the surface of the respective particles formed by encapsulating the titanium oxide with the polymer component as well as from the viewpoint of obtaining a white ink that is capable of exhibiting excellent hiding power, rub fastness and water resistance even when printed on a low-water absorbing printing material, the titanium oxide is more preferably either untreated or treated with at least one inorganic material selected from the group consisting of alumina, silica and zinc oxide, and even more preferably either untreated or treated with at least one inorganic material selected from the group consisting of alumina and zinc oxide. More specifically, the titanium oxide is further even more preferably an untreated titanium oxide or a titanium oxide that is treated with at least one inorganic material selected from the group consisting of alumina and alumina/zinc oxide.

The titanium oxide particles thus surface-treated are calcined at a temperature of not lower than 800° C. and not higher than 1000° C., so that it is possible to suppress sintering between the titanium oxide particles and thereby improve flowability and dispersibility of secondary particles of the titanium oxide.

The isoelectric point (A) of the titanium oxide obtained above is preferably not less than 4.0, more preferably not less than 4.5, even more preferably not less than 5.0, further even more preferably not less than 5.5 and still further even more preferably not less than 6.0 from the viewpoint of efficiently coating the titanium oxide with the polymer component.

Meanwhile, the isoelectric point of the titanium oxide may be measured by the method described in Examples below.

Examples of commercially available products of the rutile-type titanium dioxide include "TIPAQUE R" (tradename) series products, "TIPAQUE CR" (tradename) series products and "TIPAQUE PF" (tradename) series products all available from Ishihara Sangyo Kaisha, Ltd.; "R" (tradename) series products available from Sakai Chemical Industry Co., Ltd.; "JR" (tradename) series products and "MT" (tradename) series products both available from TAYCA Corporation; "KURONOS KR" (tradename) series products available from Titan Kogyo Co., Ltd.; and "TR" (tradename) series products available from Huntsmann Corporation.

<Step 1>

In the step 1, the titanium oxide and the polymer dispersant are mixed with each other at a pH value that is not less than an acid dissociation exponent (pKa) of at least a part of an acid component of the polymer dispersant to thereby obtain a titanium oxide dispersion, in which the polymer dispersant contains a constitutional unit derived from a hydrophobic monomer; a volume median particle size ($D_{50}$) of particles in the titanium oxide dispersion is not less than 150 nm and not more than 500 nm; and an isoelectric point (A) of the titanium oxide and the acid dissociation exponent (pKa) (B) of the polymer dispersant satisfy a relationship represented by the formula of A−B≥0.

The details of the titanium oxide are the same as described above.

(Polymer Dispersant)

The polymer dispersant used in the step 1 is preferably a dispersant that is constituted of a water-insoluble polymer containing a constitutional unit derived from a hydrophobic monomer from the viewpoint of adsorbing the polymer onto the surface of the titanium oxide and uniformly dispersing the titanium oxide in the resulting dispersion.

In the present invention, the "water-insoluble" properties of the polymer can be ascertained in the case of satisfying not only the condition that the polymer is not dissolved at all in water, but also any of the condition that Tyndall phenomenon is recognized in a water dispersion of the non-neutralized or neutralized polymer when being observed under irradiation with laser light or ordinary light, and the condition that an average particle size of the polymer particles can be measured and determined under the following measuring conditions.

Measuring Conditions:

The cumulant analysis of the water dispersion of the water-insoluble polymer is conducted using a laser particle analyzing system "ELSZ-1000" available from Otsuka Electrics Co., Ltd., under the conditions including a temperature of 25° C., an angle between incident light and detector of 165° and a cumulative number of 32 times, in which a refractive index of water (1.333) is input into the analyzing system as a refractive index of the dispersing medium, and the dispersion to be measured is diluted with water so as to adjust a concentration of the dispersion to 0.18% by mass in terms of a solid content thereof.

It is preferred that the polymer dispersant contains a salt-forming group, and the salt-forming group is at least partially neutralized with a basic compound. The polymer is preferably kept in a water-insoluble state not only surely in a non-neutralized condition, but also even after neutralizing a part of the salt-forming group.

Examples of the water-insoluble polymer used in the present invention include vinyl-based polymers, polyesters, polyurethanes and the like. In addition, as the dispersion of the water-insoluble polymer, there may also be used commercially available dispersions of water-insoluble polymer particles.

Examples of the commercially available dispersions of water-insoluble polymer particles include dispersions of polymer particles constituted of acrylic resins, urethane resins, styrene-butadiene resins, styrene-acrylic resins and vinyl chloride-based resins. Specific examples of the commercially available dispersions of water-insoluble polymer particles include dispersions of acrylic resins such as "Neocryl A1127" (anionic self-crosslinkable aqueous acrylic resin) available from DSM NeoResins, Inc., and "JONCRYL 390" available from BASF Japan, Ltd.; dispersions of urethane resins such as "WBR-2018" and "WBR-2000U" both available from Taisei Fine Chemical Co., Ltd.; dispersions of styrene-butadiene resins such as "SR-100" and "SR102" both available from Nippon A & L Inc.; dispersions of styrene-acrylic resins such as "JONCRYL 7100", "JONCRYL 734" and "JONCRYL 538" all available from BASF Japan, Ltd.; and dispersions of vinyl chloride-based resins such as "VINYBLAN 701" available from Nissin Chemical Co., Ltd., etc.

As the water-insoluble polymer, from the viewpoint of efficiently dispersing the titanium oxide with the water-insoluble polymer, preferred is a vinyl polymer that is produced by addition-polymerizing a vinyl monomer (such as a vinyl compound, a vinylidene compound and a vinylene compound), and more preferred is a vinyl polymer that is produced by copolymerizing a monomer mixture containing (a) a salt-forming group-containing monomer (hereinafter also referred to merely as a "component (a)") and (b) a hydrophobic monomer (hereinafter also referred to merely as a "component (b)") (such a mixture is hereinafter also referred to merely as a "monomer mixture").

The water-insoluble polymer contains a constitutional unit derived from the component (a) and a constitutional unit derived from the component (b). In addition, the water-insoluble polymer may further contain at least one constitutional unit selected from the group consisting of a constitutional unit derived from a macromonomer and a constitutional unit derived from a nonionic monomer.

The polymer dispersant constituted of the aforementioned vinyl polymer not only can be easily adsorbed onto the titanium oxide owing to inclusion of the constitutional unit derived from the hydrophobic monomer, but also can exhibit water-insoluble properties. Therefore, it is considered that the polymer dispersant is capable of uniformly dispersing the titanium oxide in an aqueous medium.

[(a) Salt-Forming Group-Containing Monomer]

The salt-forming group-containing monomer (a) is at least a part of an acid component of the polymer constituting the polymer dispersant, and is used from the viewpoint of enhancing dispersibility of the resulting polymer. By enhancing the dispersibility of the polymer, it is possible to improve dispersibility of the resulting white fine particles, so that the resulting water-based ink can be improved in storage stability.

Examples of the salt-forming group-containing monomer (a) include a cationic monomer and an anionic monomer. Among these monomers, preferred is an anionic monomer. When using the cationic monomer as the salt-forming group-containing monomer (a), the cationic monomer is preferably used in combination with the anionic monomer. In this case, the cationic monomer is more preferably used such that the resulting polymer dispersant is still kept anionic as a whole.

Examples of the salt-forming group include an anionic group such as a carboxy group, a sulfonic acid group and a phosphoric acid group, an amino group, an ammonium group, a group that forms a salt by itself, and the like. Among these salt-forming groups, preferred is a carboxy group.

Typical examples of the cationic monomer include amino group-containing monomers and ammonium group-containing monomers. Among these cationic monomers, preferred are N,N-dimethylaminoethyl (meth)acrylate, N-(N',N'-dimethylaminopropyl) (meth)acrylamide and vinyl pyrrolidone.

Examples of the anionic monomer include carboxylic acid monomers, sulfonic acid monomers and phosphoric acid monomers as well as salts of these monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid as well as salts of these monomers.

Specific examples of the sulfonic acid monomers include styrenesulfonic acid, 2-acrylamido-2-methylpropanesulfonic acid, 3-sulfopropyl (meth)acrylate and bis(3-sulfopropyl) itaconic acid ester as well as salts of these monomers.

Specific examples of the phosphoric acid monomers include vinylphosphonic acid, vinyl phosphate, bis(methacryloxyethyl) phosphate, diphenyl-2-acryloyloxyethyl phosphate, diphenyl-2-methacryloyloxyethyl phosphate and dibutyl-2-acryloyloxyethyl phosphate as well as salts of these monomers.

Among the aforementioned anionic monomers, from the viewpoints of improving dispersing performance of the polymer dispersant, preferred are the carboxylic acid monomers and salts of the carboxylic acid monomers, more preferred is (meth)acrylic acid, and even more preferred are acrylic acid and salts of acrylic acid. These monomers are preferably of an acid type rather than a salt type, from the viewpoint of improving polymerizability thereof.

That is, the acid component of the polymer dispersant is preferably a carboxylic acid, and more preferably (meth)acrylic acid.

[(b) Hydrophobic Monomer]

The hydrophobic monomer (b) is used from the viewpoint of enhancing affinity of the polymer to the titanium oxide as well as from the viewpoint of improving hiding power of the resulting white fine particles. Suitable examples of the hydrophobic monomer include alkyl (meth)acrylates, aromatic group-containing monomers and the like.

The monomer constituting the constitutional unit derived from the hydrophobic monomer in the polymer dispersant is preferably at least one monomer selected from the group consisting of an alkyl (meth)acrylate and an aromatic group-containing monomer, and more preferably an aromatic group-containing monomer.

As the alkyl (meth)acrylate, there may be suitably used those alkyl (meth)acrylates containing an alkyl group preferably having not less than 1 and not more than 22 carbon atoms, more preferably not less than 2 and not more than 20 carbon atoms and even more preferably not less than 3 and not more than 18 carbon atoms. Examples of the alkyl (meth)acrylate include methyl (meth)acrylate, ethyl (meth)acrylate, (iso)propyl (meth)acrylate, (iso- or tertiary-)butyl (meth)acrylate, (iso)amyl (meth)acrylate, (iso)hexyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, (iso)stearyl (meth)acrylate and the like.

Meanwhile, in the present specification, the terms "(iso- or tertiary-)" and "(iso)" as used herein mean both the structure in which any of the groups expressed by "iso- or tertiary-" and "iso" respectively are present, and the structure in which none of these groups are present (i.e., normal). In addition, the term "(meth)acrylate" as used herein means an acrylate and/or a methacrylate.

The aromatic group-containing monomer is preferably a vinyl monomer containing an aromatic group having not less than 6 and not more than 22 carbon atoms which may contain a substituting group containing a hetero atom, and more preferably at least one monomer selected from the group consisting of a styrene-based monomer and an aromatic group-containing (meth)acrylate. Specific examples of the preferred styrene-based monomer include styrene and 2-methyl styrene. Specific examples of the preferred aromatic group-containing (meth)acrylate include benzyl (meth)acrylate and phenoxyethyl (meth)acrylate.

Among these monomers, preferred is at least one monomer selected from the group consisting of styrene and benzyl (meth)acrylate, and more preferred is styrene.

In the case where the polymer dispersant contains the constitutional units derived from the components (a) and (b), from the viewpoint of improving storage stability and hiding power of the resulting dispersion of the white fine particles and the resulting water-based ink, the content of the constitutional unit derived from the component (a) in the whole constitutional units of the polymer dispersant is preferably not less than 20% by mass, more preferably not less than 30% by mass, even more preferably not less than 40% by mass and further even more preferably not less than 45% by mass, and is also preferably not more than 80% by mass, more preferably not more than 70% by mass and even more preferably not more than 60% by mass.

Also, the content of the constitutional unit derived from the component (b) in the whole constitutional units of the polymer dispersant is preferably not less than 20% by mass, more preferably not less than 30% by mass and even more preferably not less than 40% by mass, and is also preferably not more than 80% by mass, more preferably not more than 70% by mass, even more preferably not more than 60% by mass and further even more preferably not more than 55% by mass.

In addition, the total content of the constitutional units derived from the components (a) and (b) in the whole constitutional units of the polymer dispersant is preferably not less than 90% by mass, more preferably not less than 95% by mass and even more preferably not less than 99% by mass, and is also not more than 100% by mass, and furthermore preferably 100% by mass.

The number-average molecular weight of the polymer dispersant is preferably not less than 1,000, more preferably not less than 1,500 and even more preferably not less than 2,000, and is also preferably not more than 30,000, more preferably not more than 10,000, even more preferably not more than 8,000, further even more preferably not more than 5,000 and still further even more preferably not more than 4,000 from the viewpoint of satisfying both of high dispersibility of the titanium oxide and good storage stability of the resulting water-based ink as well as from the viewpoint of improving hiding power of the resulting white fine particles. Meanwhile, the number-average molecular weight of the polymer dispersant may be measured by the method described in Examples below.

In addition, in the case where the component (a) is in the form of an anionic monomer, the acid value of the polymer dispersant is preferably not less than 100 mgKOH/g, more preferably not less than 200 mgKOH/g, even more preferably not less than 300 mgKOH/g and further even more preferably not less than 450 mgKOH/g, and is also preferably not more than 700 mgKOH/g, more preferably not more than 650 mgKOH/g and even more preferably not more than 600 mgKOH/g, from the viewpoint of satisfying both of high dispersibility of the titanium oxide and good storage stability of the resulting water-based ink.

Meanwhile, the acid value of the polymer dispersant may be calculated from the mass ratio between the monomers constituting the polymer dispersant. Alternatively, the acid value of the polymer dispersant may also be determined by the method in which the polymer is dissolved in an appropriate organic solvent (for example, such as MEK) or swelled therewith, and then subjected to titration.

(Production of Polymer Dispersant)

The polymer dispersant may be produced by copolymerizing the aforementioned monomer mixture by known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably an organic polar solvent. If the organic polar solvent is miscible with water, the organic solvent may be used in the form of a mixture with water. Examples of the organic polar solvent include aliphatic alcohols having not less than 1 and not more than 3 carbon atoms, ketones having not less than 3 and not more than 5 carbon atoms, ethers, esters and the like. Among these organic polar solvents, preferred are the aliphatic alcohols, the ketones, or a mixed solvent of any of these organic solvents with water, and more preferred is methyl ethyl ketone or a mixed solvent of methyl ethyl ketone and water.

The polymerization may be carried out in the presence of a polymerization initiator or a chain transfer agent.

Examples of the polymerization initiator include conventionally known radical polymerization initiators, e.g., azo compounds such as 2,2'-azobisisobutyronitrile and 2,2'-azobis(2,4-dimethylvaleronitrile), and organic peroxides such as t-butyl hydroperoxide, t-butyl peroxyoctoate, benzoyl peroxide and the like.

Examples of the chain transfer agent include conventionally known chain transfer agents, e.g., mercaptans such as octyl mercaptan, 2-mercaptoethanol and 3-mercaptopropionic acid, and thiuram disulfides.

In addition, the type of a polymerization chain of polymers obtained from the respective monomers to be polymerized is not particularly limited, and may be of any polymerization type including a random type, a block type and a graft type, etc.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or in an atmosphere of an inert gas such as argon.

After completion of the polymerization reaction, the polymer produced may be isolated from the obtained reaction solution by conventionally known methods such as reprecipitation and removal of the solvent by distillation.

(Mixing Conditions of Titanium Oxide and Polymer Dispersant)

In the step 1, from the viewpoint of enhancing affinity of the polymer dispersant to the titanium oxide and improving coating properties by the polymer dispersant, the titanium oxide and the polymer dispersant are mixed with each other at a pH value that is not less than an acid dissociation exponent (pKa) of at least a part of an acid component of the polymer dispersant to thereby obtain a titanium oxide dispersion.

The acid component contained in the polymer dispersant is derived from the salt-forming group-containing monomer (a), and is consisted of one or more kinds of acid compounds. When the acid component of the polymer dispersant is constituted of two or more kinds of acid compounds, it is preferred that the titanium oxide and the polymer dispersant are mixed with each other at a pH value that is not less than an acid dissociation exponent (pKa) of at least a part of the acid component (at least one kind of acid compound), and it is more preferred that the titanium oxide and the polymer dispersant are mixed with each other at a pH value that is not less than the highest acid dissociation exponent (pKa) among those of the acid compounds contained in the acid component.

The acid dissociation exponent (pKa) of at least a part of the acid component of the polymer dispersant is preferably not more than 5.5, more preferably not more than 5.0, even more preferably not more than 4.8 and further even more preferably not more than 4.6 from the viewpoint of enhancing affinity of the polymer dispersant to the titanium oxide and improving coating properties by the polymer dispersant. In addition, the lowest acid dissociation exponent (pKa) of at least a part of the acid component of the polymer dispersant is preferably not less than 1, more preferably not less than 2, even more preferably not less than 3 and further even more preferably not less than 4 from the viewpoint of suppressing corrosion of an ink-jet printing apparatus by the resulting ink.

In consequence, the pH value at which the titanium oxide and the polymer dispersant are mixed with each other is preferably not less than 4.6, more preferably not less than 4.8, even more preferably not less than 5.0 and further even more preferably not less than 5.2.

Incidentally, the acid dissociation exponent (pKa) of the acid component of the polymer dispersant means the value of common logarithm of an inverse number of an acid dissociation constant (Ka) thereof (−log Ka) which is described in The Chemical Society of Japan, Handbook of Chemistry, Pure Chemistry II, Revised 4th Edition, published by MARUZEN Publishing Co., Ltd. If no value concerning the acid dissociation exponent (pKa) of the acid component of the polymer dispersant is found in the aforementioned literature, the acid dissociation exponent (pKa) may also be determined by the method described in F. K. Hartley, C. Burgess and R. M. Alcocok, "Solution Equilibria", John Wilery (1980) using a pH meter "F-23" (temperature: 25° C.) commercially available from HORIBA Ltd., etc.

In addition, from the same viewpoint as described above, the aforementioned isoelectric point (A) of the titanium oxide and the aforementioned acid dissociation exponent (pKa) (B) of at least a part of the acid component of the polymer dispersant satisfy the relationship represented by the formula of A−B≥0. The value of (A−B) in the aforementioned formula is preferably not less than 0.1, more preferably not less than 0.5, even more preferably not less than 1.0, further even more preferably not less than 1.5 and still further even more preferably not less than 2.0, and is also preferably not more than 10.

In the step 1, the mixture obtained by mixing the titanium oxide and the polymer dispersant may be further subjected to dispersion treatment, if required, to thereby obtain the titanium oxide dispersion.

The dispersing method for obtaining the titanium oxide dispersion is not particularly limited. If a mixture containing the titanium oxide, the polymer dispersant and an aqueous medium (hereinafter also referred to merely as a "titanium oxide mixture") is subjected to dispersion treatment, it is possible to more efficiently obtain the titanium oxide dispersion.

(Aqueous Medium)

The aqueous medium as used herein means a medium containing water as a main component. Examples of an organic solvent that may be contained in the aqueous medium as a component other than water include aliphatic alcohols having not less than 1 and not more than 4 carbon atoms; ketones having not less than 3 and not more than 8 carbon atoms; ethers such as ethyl ether, propyl ether, butyl ether and tetrahydrofuran; and esters such as methyl acetate and ethyl acetate, and the like. Among these organic solvents, from the viewpoint of improving wettability of the organic solvents to the titanium oxide particles, solubility of the polymer dispersant in the organic solvents, and adsorptivity of the polymer dispersant to the titanium oxide particles, preferred are ketones having not less than 4 and not more than 6 carbon atoms, more preferred are methyl ethyl ketone and methyl isobutyl ketone, and even more preferred is methyl ethyl ketone. In the case where the polymer dispersant is synthesized by a solution polymerization method, the solvent used in the solution polymerization method may be directly used as such in the step 1.

The content of water in the aqueous medium is preferably not less than 50% by mass, more preferably not less than 60% by mass and even more preferably not less than 70% by mass, and is also not more than 100% by mass, and furthermore preferably 100% by mass, from the viewpoint of improving environmental conditions.

(Neutralization)

In the case where the carboxyl groups as the salt-forming groups contained in the polymer dispersant are at least partially neutralized, the pH value of the resulting dispersion is controlled to not less than 7, preferably not less than 7.5 and more preferably not less than 8.5, and is also preferably controlled to not more than 13 and more preferably not more than 11.

As the neutralizing agent, from the viewpoint of improving storage stability and ejection stability of the resulting dispersion of the white fine particles and the resulting water-based ink, there may be used basic compounds such as alkali metal hydroxides and organic amines. Of these neutralizing agents, preferred are alkali metal hydroxides.

Specific examples of the alkali metal hydroxides include lithium hydroxide, sodium hydroxide, potassium hydroxide, cesium hydroxide and the like. Of these alkali metal hydroxides, preferred are sodium hydroxide and potassium hydroxide.

Specific examples of the organic amines include trimethylamine, ethylamine, diethylamine, trimethylamine, triethanolamine and the like. Also, the polymer dispersant may be previously neutralized.

The neutralizing agent is preferably used in the form of an aqueous neutralizing agent solution from the viewpoint of sufficiently and uniformly accelerating the neutralization of the carboxy groups of the polymer dispersant. From the same viewpoint as described above, the concentration of the aqueous neutralizing agent solution is preferably not less than 5% by mass, more preferably not less than 10% by mass and even more preferably not less than 15% by mass, and is also preferably not more than 30% by mass, more preferably not more than 25% by mass and even more preferably not more than 20% by mass.

The neutralization degree of the carboxy groups of the polymer dispersant is preferably not less than 10 mol %, more preferably not less than 20 mol %, even more preferably not less than 30 mol %, further even more preferably not less than 40 mol % and still further even more preferably not less than 50 mol %, and is also preferably not more than 300 mol %, more preferably not more than 200 mol % and even more preferably not more than 150 mol %, from the viewpoint of improving storage stability, etc., of the resulting dispersion of the white fine particles and the resulting water-based ink.

The neutralization degree as used herein means the value calculated by dividing a mole equivalent number of the alkali metal hydroxide by a mole equivalent number of the carboxy groups of the polymer dispersant. Inherently, the neutralizing degree does not exceed 100%. However, since the neutralization degree of the polymer dispersant as defined in the present invention is calculated from the amount of the neutralizing agent used, the neutralization degree will exceed 100 mol % if the neutralizing agent is used in an excessively large amount.

(Dispersion Treatment of Titanium Oxide Mixture)

The dispersing method for obtaining the titanium oxide dispersion is not particularly limited. The titanium oxide particles may be atomized into fine particles having a desired average particle size only by substantial dispersion treatment. However, it is preferred that the titanium oxide mixture is first subjected to preliminary dispersion treatment, and then further subjected to the substantial dispersion treatment by applying a shear stress thereto so as to control the average particle size of the obtained titanium oxide particles to a desired value.

In the preliminary dispersion treatment, there may be used ordinary mixing and stirring devices that may be generally used in dispersion treatments, such as anchor blades and disper blades. Of these devices, preferred are high-speed stirring mixers.

As a means for applying a shear stress to the titanium oxide mixture in the substantial dispersion treatment, there may be used, for example, kneading machines such as roll mills and kneaders, high-pressure homogenizers such as "MICROFLUIDIZER", and media-type dispersers such as paint shakers and beads mills. Among these devices, the high-pressure homogenizers are preferably used from the viewpoint of reducing a particle size of the titanium oxide. In the case where the substantial dispersion treatment is conducted using the high-pressure homogenizer, the particle size of the titanium oxide can be adjusted to a desired value by controlling the treating pressure and the number of passes through the homogenizer used in the substantial dispersion treatment.

The content of the titanium oxide in the titanium oxide dispersion is preferably not less than 5% by mass, more preferably not less than 10% by mass and even more preferably not less than 12% by mass, and is also preferably not more than 45% by mass, more preferably not more than 35% by mass and even more preferably not more than 25% by mass, from the viewpoint of improving dispersion stability of the titanium oxide dispersion.

The content of the polymer dispersant in the titanium oxide dispersion is preferably not less than 0.5% by mass, more preferably not less than 1.0% by mass, even more preferably not less than 1.5% by mass and further even more preferably not less than 2.0% by mass, and is also preferably not more than 6.0% by mass, more preferably not more than 5.5% by mass, even more preferably not more than 5.0% by mass and further even more preferably not more than 4.5% by mass, from the viewpoint of enhancing adsorptivity of the polymer dispersant onto the surface of the titanium oxide to uniformly disperse the titanium oxide in the resulting dispersion.

The volume median particle size ($D_{50}$) of the particles in the titanium oxide dispersion is not less than 150 nm, preferably not less than 180 nm and more preferably not less than 200 nm, and is also not more than 500 nm, preferably not more than 400 nm and more preferably not more than 350 nm, from the viewpoint of improving hiding power of the resulting white fine particles.

Meanwhile, the volume median particle size ($D_{50}$) as used herein means a particle size at which a cumulative volume frequency as measured on the basis of a volume fraction of the particles and accumulated from a smaller particle size side thereof is 50%, and may be determined by the method described in Examples below.

<Step 2>

In the step 2, a polymerizable monomer is added to the titanium oxide dispersion obtained in the step 1 to subject the polymerizable monomer to polymerization reaction, thereby obtaining a dispersion of the white fine particles.

(Polymerizable Monomer)

The polymerizable monomer preferably includes at least one monomer selected from the group consisting of a (meth)acrylate monomer and an aromatic group-containing monomer, and more preferably includes a (meth)acrylate monomer from the viewpoint of improving dispersibility and hiding power of the resulting white fine particles.

Specific examples of the (meth)acrylate monomer include (meth)acrylates containing an alkyl group having not less than 1 and not more than 10 carbon atoms and preferably not less than 1 and not more than 8 carbon atoms, such as methyl (meth)acrylate, ethyl (meth)acrylate, propyl (meth)acrylate, butyl (meth)acrylate and 2-ethylhexyl (meth)acrylate; and alicyclic (meth)acrylates such as isobornyl (meth)acrylate and cyclohexyl (meth)acrylate. Of these (meth)acrylate monomers, from the viewpoint of improving dispersibility and hiding power of the resulting white fine particles, preferred are (meth)acrylates containing an alkyl group having not less than 1 and not more than 8 carbon atoms and more preferably not less than 1 and not more than 6 carbon atoms.

The aromatic group-containing monomer is preferably a vinyl monomer containing an aromatic group having not less than 6 and not more than 22 carbon atoms, and more preferably a styrene-based monomer or an aromatic group-containing (meth)acrylate.

Specific examples of the preferred styrene-based monomer include styrene, 2-methyl styrene, vinyl toluene and divinyl benzene. Among these styrene-based monomers, more preferred are styrene and 2-methyl styrene. Specific examples of the preferred aromatic group-containing (meth)acrylate include phenyl (meth)acrylate, benzyl (meth)acrylate and phenoxyethyl (meth)acrylate, etc.

As the polymerizable monomer, there may be used any two or more of the aforementioned monomers.

In the step 2, in addition to the at least one polymerizable monomer selected from the group consisting of the (meth)acrylate monomer and the aromatic group-containing monomer, an anionic monomer such as a carboxylic acid monomer, a sulfonic acid monomer and a phosphoric acid monomer, and a cationic monomer may also be added. Of these monomers, preferred is the carboxylic acid monomer, and more preferred is (meth)acrylic acid.

In addition, in the step 2, various monomers such as polyethylene glycol mono(meth)acrylate, methoxy polyethylene glycol mono(meth)acrylate, octoxy polyethylene glycol mono(meth)acrylate and stearoxy polyethylene glycol mono(meth)acrylate may also be used, if necessary.

The content of the at least one polymerizable monomer selected from the group consisting of the (meth)acrylate monomer and the aromatic group-containing monomer in the whole polymerizable monomers added is preferably not less than 80% by mass, more preferably not less than 90% by mass and even more preferably not less than 95% by mass from the viewpoint of improving dispersibility and hiding power of the resulting white fine particles.

The content of the monomers other than the polymerizable monomer (i.e., at least one monomer selected from the group consisting of the (meth)acrylate monomer and the aromatic group-containing monomer) in the whole monomers used in the step 2 is preferably not more than 20% by mass, more preferably not more than 10% by mass and even more preferably not more than 5% by mass from the viewpoint of improving dispersibility and hiding power of the resulting white fine particles.

The method of adding the polymerizable monomer to the titanium oxide dispersion is not particularly limited, and the polymerizable monomer may be added to the dispersion by conventionally known methods such as a monomer dropwise addition method, a monomer batch charging method and a pre-emulsion method, etc. Among these methods, preferred is the monomer dropwise addition method.

The polymerizable monomer may be polymerized by conventionally known polymerization methods such as a bulk polymerization method, a solution polymerization method, a suspension polymerization method and an emulsion polymerization method, etc. Among these polymerization methods, preferred are an aqueous system suspension polymerization method and an emulsion polymerization method, more preferred is an emulsion polymerization method. As the emulsion polymerization method, even more preferred is a seed polymerization method.

The aqueous system suspension polymerization method is such a method in which a mixture containing the titanium oxide, the polymer dispersant and an aqueous medium is subjected to dispersion treatment by an ordinary method to obtain the titanium oxide dispersion, and then the polymerizable monomer is added and mixed in the thus obtained titanium oxide dispersion to subject the polymerizable monomer to polymerization reaction. In the aforementioned method, it is preferred that after subjecting the titanium oxide dispersion to dispersion treatment, a polymerization initiator is added to the resulting dispersion to subject the polymerizable monomer to polymerization reaction at a temperature of not lower than 50° C. and not higher than 100° C. while stirring the dispersion.

The seed polymerization method is such a method in which after allowing the polymer dispersant to adsorb onto the surface of the respective titanium oxide particles, the resulting particles as seed particles are uniformly dispersed in an aqueous medium, and then the polymerizable monomer is added and mixed in the resulting dispersion, and further the resulting mixture is subjected to dispersion treatment by an ordinary method to adsorb the polymerizable monomer onto the seed particles, followed by adding the polymerization initiator to the resulting dispersion to subject the polymerizable monomer to emulsion polymerization on the surface of the respective seed particles.

In the following, the emulsion polymerization method, in particular, the seed emulsion polymerization method, is explained as a typical example of the polymerization methods.

(Polymerization Initiator)

As the polymerization initiator, any polymerization initiators may be used as long as they can be suitably used in ordinary emulsion polymerization processes. Specific examples of the polymerization initiator include persulfuric acid salts such as potassium persulfate and ammonium persulfate; hydrogen peroxide; organic peroxides such as t-butyl hydroperoxide, t-butyl peroxyoctoate, benzoyl peroxide and cumene hydroperoxide; azo-based polymerization initiators such as 2,2'-azobisisobutyronitrile, 2,2'-azobis(2,4-dimethylvaleronitrile), 4,4'-azobis(4-cyanovaleric acid) and 2,2-azobis(2-amidinopropane) dihydrochloride; and redox-based polymerization initiators. Of these polymerization initiators, from the viewpoint of accelerating polymerization of the polymerizable monomer and improving hiding power of the resulting white fine particles, the water-soluble polymerization initiator is preferably used, and the azo-based polymerization initiator is more preferably used.

In the emulsion polymerization method, there may also be used a chain transfer agent. Examples of the chain transfer agent include mercaptans such as n-dodecyl mercaptan, t-dodecyl mercaptan, n-octyl mercaptan, 2-mercaptoethanol and 3-mercaptopropionic acid; xanthogens such as dimethyl xanthogen disulfide and diisobutyl xanthogen disulfide; thiuram disulfides; and dipentene, indene, 1,4-cyclohexadiene, dihydrofuran, xanthene and the like.

In the step 2, in order to enhance polymerization stability, a surfactant may also be added. As the surfactant, there may be used conventionally known surfactants such as anionic or nonionic surfactants for emulsion polymerization.

The amount of the polymerizable monomer used is preferably not less than 2% by mass, more preferably not less than 5% by mass and even more preferably not less than 10% by mass, and is also preferably not more than 30% by mass, more preferably not more than 25% by mass and even more preferably not more than 20% by mass, on the basis of the composition of the whole reaction system used in the polymerization reaction in the step 2, from the viewpoint of improving dispersibility and hiding power of the resulting white fine particles.

The mass ratio of the polymerizable monomer to the titanium oxide [polymerizable monomer/titanium oxide] is preferably not less than 0.1, more preferably not less than 0.2, even more preferably not less than 0.3 and further even more preferably not less than 0.5, and is also preferably not more than 2.0, more preferably not more than 1.5 and even more preferably not more than 1.2, from the viewpoint of improving dispersibility and hiding power of the resulting white fine particles.

The mass ratio of the polymerizable monomer to the polymer dispersant [polymerizable monomer/polymer dispersant] is preferably not less than 1, more preferably not less than 2 and even more preferably not less than 3, and is also preferably not more than 50, more preferably not more than 25 and even more preferably not more than 15, from the viewpoint of improving dispersibility and hiding power of the resulting white fine particles.

The temperature used upon the polymerization reaction in the step 2 may be appropriately controlled depending upon a temperature of decomposition of the polymerization initiator. The polymerization temperature is preferably not lower than 50° C., more preferably not lower than 60° C. and even more preferably not lower than 70° C. from the viewpoint of improving the reactivity, and is also preferably not higher than 90° C. and more preferably not higher than 85° C. from the viewpoint of improving a molecular weight distribution of the resulting polymer.

In the present invention, the thus obtained polymer may be further subjected to crosslinking treatment from the viewpoint of improving storage stability and hiding power of the resulting dispersion of the white fine particles and the resulting water-based ink. Examples of a crosslinking agent used in the crosslinking treatment include a compound containing two or more reactive functional groups in a molecule thereof, such as a compound containing two or more epoxy groups in a molecule thereof. Examples of the compound containing two or more epoxy groups in a molecule thereof include ethylene glycol diglycidyl ether, trimethylolpropane polyglycidyl ether, etc.

(Properties of White Fine Particles)

In the dispersion of the white fine particles produced by the aforementioned process, the titanium oxide is covered with the polymer component, and as an index indicating the degree of covering the titanium oxide with the polymer component, there may be used a titanium atomic fraction as measured by X-ray photoelectron spectroscopy (XPS). From the viewpoint of obtaining a white ink that is capable of exhibiting excellent hiding power, rub fastness and water resistance even when printed on a low-water absorbing printing medium, the titanium atomic fraction of the white fine particles as measured by X-ray photoelectron spectroscopy (XPS) is preferably not more than 7 atomic %, more preferably not more than 5 atomic %, even more preferably not more than 3 atomic %, further even more preferably not more than 2 atomic % and still further even more preferably 0 atomic %.

In addition, in the thus obtained white fine particles, the mass ratio of the titanium oxide to the polymer component [titanium oxide/polymer component] is preferably not less than 20/80, more preferably not less than 25/75 and even more preferably not less than 30/70, and is also preferably not more than 80/20, more preferably not more than 70/30, even more preferably not more than 60/40 and further even more preferably not more than 50/50.

The mass of the polymer component as used herein means a total mass of the polymer dispersant used in the step 1 and the polymer obtained by the seed polymerization in the step 2. The polymer component preferably further contains the polymer containing a constitutional unit derived from at least one polymerizable monomer selected from the group consisting of a (meth)acrylate monomer and an aromatic group-containing monomer, in addition to the underlying polymer dispersant containing the constitutional unit derived from at least one monomer selected from the group consisting of an alkyl (meth)acrylate and an aromatic group-containing monomer. More specifically, the mass of the polymer component is a total mass of the polymers respectively containing a constitutional unit derived from at least one monomer selected from the group consisting of (meth)acrylic acid, an aromatic group-containing monomer and an alkyl (meth)acrylate, etc.

The mass ratio of the titanium oxide to the polymer component [titanium oxide/polymer component] in the white fine particles may be calculated from the respective masses of the titanium oxide and the polymer component which are determined from amounts of the raw materials charged upon production of the white fine particles, thermogravimetry (TG), etc.

The volume median particle size ($D_{50}$) of the white fine particles in the dispersion of the white fine particles is preferably not less than 150 nm, more preferably not less than 200 nm, even more preferably not less than 220 nm and further even more preferably not less than 250 nm, and is also preferably not more than 500 nm, more preferably not more than 400 nm and even more preferably not more than 350 nm, from the viewpoint of improving hiding power of the white fine particles.

Meanwhile, the volume median particle size ($D_{50}$) may be measured by the method described in Examples below.

The dispersion of the white fine particles which is produced by the process of the present invention can be suitably used as a printing colorant for an aqueous gravure ink, an aqueous flexographic ink, a water-based ink for ink-jet printing, etc. In particular, the dispersion of the white fine particles is excellent in ejection stability, and therefore is preferably used for a water-based ink for ink-jet printing.

[Water-Based Ink for Ink-Jet Printing]

The water-based ink for ink-jet printing according to the present invention contains the white fine particles obtained by the process of the present invention.

The water-based ink of the present invention may be produced by adding water to the dispersion of the white fine particles according to the present invention, followed by mixing the resulting dispersion. The water-based ink may also be compounded with various additives that may be usually used in water-based inks, such as an organic solvent, a surfactant, a wetting agent, a penetrant, a dispersant, a viscosity controller, a defoaming agent, a mildew-proof agent, a rust preventive and an ultraviolet absorber, if required.

Examples of the organic solvent that may be contained in the water-based ink include polyhydric alcohols, polyhydric alcohol alkyl ethers, polyhydric alcohol aryl ethers, cyclic carbonates, nitrogen-containing heterocyclic compounds, amides, amines, sulfur-containing compounds and the like. Of these organic solvents, preferred is at least one organic solvent selected from the group consisting of polyhydric alcohols and polyhydric alcohol alkyl ethers, and more preferred is at least one organic solvent selected from the group consisting of diethylene glycol, propylene glycol, dipropylene glycol, 1,2-butanediol, 1,2-hexanediol, glycerin, diethylene glycol monomethyl ether and dipropylene glycol monomethyl ether.

Examples of the surfactant that may be contained in the water-based ink include a nonionic surfactant, an anionic surfactant, an amphoteric surfactant, a silicone-based surfactant, a fluorine-based surfactant and the like. Of these surfactants, preferred is at least one surfactant selected from the group consisting of a nonionic surfactant and a silicone-based surfactant.

In the water-based ink of the present invention, the contents of respective components therein and the ink properties may be defined as follows from the viewpoint of improving hiding power, rub fastness and water resistance, etc., on the printing medium of the resulting printed material.

(Content of Titanium Oxide)

The content of the titanium oxide in the water-based ink is preferably not less than 0.5% by mass, more preferably not less than 1% by mass and even more preferably not less than 2% by mass, and is also preferably not more than 20% by mass, more preferably not more than 17% by mass and even more preferably not more than 15% by mass, from the viewpoint of improving hiding power of the resulting water-based ink.

(Content of Organic Solvent)

The content of the organic solvent in the water-based ink is preferably not less than 10% by mass, more preferably not less than 20% by mass and even more preferably not less than 25% by mass from the viewpoint of improving moisture-retaining properties of the resulting water-based ink, and is also preferably not more than 50% by mass, more preferably not more than 45% by mass and even more preferably not more than 40% by mass from the same viewpoint as described above.

(Content of Water)

The content of water in the water-based ink is preferably not less than 30% by mass, more preferably not less than 35% by mass and even more preferably not less than 40% by mass, and is also preferably not more than 80% by mass, more preferably not more than 70% by mass and even more preferably not more than 60% by mass, from the viewpoint of reducing burden on the environment.

(Properties of Water-Based Ink)

The pH value of the water-based ink as measured at 20° C. is preferably not less than 5.5, more preferably not less than 6.0 and even more preferably not less than 6.5 from the viewpoint of improving ejection stability of the resulting water-based ink, and is also preferably not more than 11.0, more preferably not more than 10.0, even more preferably not more than 9.5 and further even more preferably not more than 9.0 from the viewpoint of improving the resistance of members to the ink and suppressing skin irritation.

Meanwhile, the pH value of the water-based ink as measured at 20° C. may be measured by the method described in Examples below.

The viscosity of the water-based ink as measured at 32° C. is preferably not less than 2.0 mPa·s, more preferably not less than 3.0 mPa·s and even more preferably not less than 3.5 mPa·s from the viewpoint of improving ejection stability of the resulting water-based ink, and is also preferably not more than 12 mPa·s, more preferably not more than 9.0 mPa·s, even more preferably not more than 7.0 mPa·s, further even more preferably not more than 5.5 mPa·s and still further even more preferably not more than 4.5 mPa·s from the same viewpoint as described above.

With respect to the aforementioned embodiments, the present invention further provides the following aspects relating to the process for producing a dispersion of white fine particles and the water-based ink for ink-jet printing which contains the white fine particles.

<1> A process for producing a dispersion of white fine particles, including the following steps 1 and 2:

Step 1: mixing titanium oxide and a polymer dispersant at a pH value that is not less than an acid dissociation exponent (pKa) of at least a part of an acid component of the polymer dispersant to thereby obtain a titanium oxide dispersion, in which an isoelectric point (A) of the titanium oxide and the acid dissociation exponent (pKa) (B) of the polymer dispersant satisfy a relationship represented by the formula:

$$A-B \geq 0,$$

the polymer dispersant contains a constitutional unit derived from a hydrophobic monomer, and a volume median particle size ($D_{50}$) of particles in the titanium oxide dispersion is not less than 150 nm and not more than 500 nm; and Step 2: adding a polymerizable monomer to the titanium oxide dispersion obtained in the step 1 to subject the polymerizable monomer to polymerization reaction, thereby obtaining the dispersion of the white fine particles.

<2> The process for producing a dispersion of white fine particles according to the aspect <1>, wherein an average primary particle size of the titanium oxide is preferably not less than 40 nm, more preferably not less than 100 nm, even more preferably not less than 150 nm and further even more preferably not less than 200 nm, and is also preferably not more than 400 nm, more preferably not more than 350 nm and even more preferably not more than 300 nm.

<3> The process for producing a dispersion of white fine particles according to the aspect <1> or <2>, wherein the titanium oxide is preferably either untreated or treated with at least one material selected from the group consisting of alumina, silica and zinc oxide, and more preferably either untreated or treated with at least one material selected from the group consisting of alumina and zinc oxide.

<4> The process for producing a dispersion of white fine particles according to any one of the aspects <1> to <3>, wherein the isoelectric point of the titanium oxide is preferably not less than 4.0, more preferably not less than 4.5, even more preferably not less than 5.0, further even more preferably not less than 5.5 and still further even more preferably not less than 6.0.

<5> The process for producing a dispersion of white fine particles according to any one of the aspects <1> to <4>, wherein the polymer dispersant is a dispersant that is constituted of a water-insoluble polymer.

<6> The process for producing a dispersion of white fine particles according to the aspect <5>, wherein the water-insoluble polymer contains a constitutional unit derived from (a) a salt-forming group-containing monomer and a constitutional unit derived from (b) a hydrophobic monomer.

<7> The process for producing a dispersion of white fine particles according to the aspect <6>, wherein the water-insoluble polymer contains the constitutional unit derived from the component (a) in an amount of preferably not less than 20% by mass, more preferably not less than 30% by mass, even more preferably not less than 40% by mass and further even more preferably not less than 45% by mass, and also in an amount of preferably not more than 80% by mass, more preferably not more than 70% by mass and even more preferably not more than 60% by mass, on the basis of the whole constitutional units of the polymer dispersant.

<8> The process for producing a dispersion of white fine particles according to the aspect <6> or <7>, wherein the water-insoluble polymer contains the constitutional unit derived from the component (b) in an amount of preferably not less than 20% by mass, more preferably not less than 30% by mass and even more preferably not less than 40% by mass, and also in an amount of preferably not more than 80% by mass, more preferably not more than 70% by mass, even more preferably not more than 60% by mass and further even more preferably not more than 55% by mass, on the basis of the whole constitutional units of the polymer dispersant.

<9> The process for producing a dispersion of white fine particles according to any one of the aspects <1> to <8>, wherein a number-average molecular weight of the polymer dispersant is preferably not less than 1,000, more preferably not less than 1,500 and even more preferably not less than 2,000, and is also preferably not more than 30,000, more preferably not more than 10,000, even more preferably not more than 8,000, further even more preferably not more than 5,000 and still further even more preferably not more than 4,000.

<10> The process for producing a dispersion of white fine particles according to any one of the aspects <1> to <9>, wherein an acid value of the polymer dispersant is preferably not less than 100 mgKOH/g, more preferably not less than 200 mgKOH/g, even more preferably not less than 300 mgKOH/g and further even more preferably not less than 450 mgKOH/g, and is also preferably not more than 700 mgKOH/g, more preferably not more than 650 mgKOH/g and even more preferably not more than 600 mgKOH/g.

<11> The process for producing a dispersion of white fine particles according to any one of the aspects <1> to <10>, wherein the acid dissociation exponent (pKa) of at least a part of the acid component of the polymer dispersant is preferably not more than 5.5, more preferably not more than 5.0, even more preferably not more than 4.8 and further even more preferably not more than 4.6, and is also preferably not less than 1, more preferably not less than 2, even more preferably not less than 3 and further even more preferably not less than 4.

<12> The process for producing a dispersion of white fine particles according to any one of the aspects <1> to <11>, wherein the acid component of the polymer dispersant is preferably a carboxylic acid, and more preferably (meth)acrylic acid.

<13> The process for producing a dispersion of white fine particles according to any one of the aspects <1> to <12>, wherein the pH value at which the titanium oxide and the polymer dispersant are mixed with each other is preferably not less than 4.6, more preferably not less than 4.8, even more preferably not less than 5.0 and further even more preferably not less than 5.2.

<14> The process for producing a dispersion of white fine particles according to any one of the aspects <1> to <13>, wherein the value of (A–B) in the formula representing the relationship between the isoelectric point (A) of the titanium oxide and the acid dissociation exponent (pKa) (B) of at least a part of the acid component of the polymer dispersant is preferably not less than 0.1, more preferably not less than 0.5, even more preferably not less than 1.0, further even more preferably not less than 1.5 and still further even more preferably not less than 2.0, and is also preferably not more than 10.

<15> The process for producing a dispersion of white fine particles according to any one of the aspects <1> to <14>, wherein a content of the titanium oxide in the titanium oxide dispersion is preferably not less than 5% by mass, more preferably not less than 10% by mass and even more preferably not less than 12% by mass, and is also preferably not more than 45% by mass, more preferably not more than 35% by mass and even more preferably not more than 25% by mass.

<16> The process for producing a dispersion of white fine particles according to any one of the aspects <1> to <15>, wherein a content of the polymer dispersant in the titanium oxide dispersion is preferably not less than 0.5% by mass, more preferably not less than 1.0% by mass, even more preferably not less than 1.5% by mass and further even more preferably not less than 2.0% by mass, and is also preferably not more than 6.0% by mass, more preferably not more than 5.5% by mass, even more preferably not more than 5.0% by mass and further even more preferably not more than 4.5% by mass.

<17> The process for producing a dispersion of white fine particles according to any one of the aspects <1> to <16>, wherein the volume median particle size ($D_{50}$) of particles in the titanium oxide dispersion is not less than 150 nm, preferably not less than 180 nm and more preferably not less than 200 nm, and is also not more than 500 nm, preferably not more than 400 nm and more preferably not more than 350 nm.

<18> The process for producing a dispersion of white fine particles according to any one of the aspects <1> to <17>, wherein the polymerizable monomer preferably includes at least one monomer selected from the group consisting of a (meth)acrylate and an aromatic group-containing monomer, more preferably a (meth)acrylate, and even more preferably a (meth)acrylate containing an alkyl group having not less than 1 and not more than 8 carbon atoms and preferably not less than 1 and not more than 6 carbon atoms.

<19> The process for producing a dispersion of white fine particles according to any one of the aspects <1> to <18>, wherein a method of polymerizing the polymerizable monomer is preferably an aqueous system suspension polymerization method or an emulsion polymerization method, more preferably an emulsion polymerization method, and even more preferably a seed emulsion polymerization method.

<20> The process for producing a dispersion of white fine particles according to any one of the aspects <1> to <19>, wherein an amount of the polymerizable monomer used is preferably not less than 2% by mass, more preferably not less than 5% by mass and even more preferably not less than 10% by mass, and is also preferably not more than 30% by mass, more preferably not more than 25% by mass and even more preferably not more than 20% by mass, on the basis of a composition of the whole reaction system used in the polymerization reaction in the step 2.

<21> The process for producing a dispersion of white fine particles according to any one of the aspects <1> to <20>, wherein a mass ratio of the polymerizable monomer to the titanium oxide [polymerizable monomer/titanium oxide] is preferably not less than 0.1, more preferably not less than 0.2, even more preferably not less than 0.3 and further even more preferably not less than 0.5, and is also preferably not more than 2.0, more preferably not more than 1.5 and even more preferably not more than 1.2.

<22> The process for producing a dispersion of white fine particles according to any one of the aspects <1> to <21>, wherein a mass ratio of the polymerizable monomer to the polymer dispersant [polymerizable monomer/polymer dispersant] is preferably not less than 1, more preferably not less than 2 and even more preferably not less than 3, and is also preferably not more than 50, more preferably not more than 25 and even more preferably not more than 15.

<23> The process for producing a dispersion of white fine particles according to any one of the aspects <1> to <22>, wherein a mass ratio of the titanium oxide to the polymer component [titanium oxide/polymer component] in the white fine particles is preferably not less than 20/80, more preferably not less than 25/75 and even more preferably not less than 30/70, and is also preferably not more than 80/20, more preferably not more than 70/30, even more preferably not more than 60/40 and further even more preferably not more than 50/50.

<24> The process for producing a dispersion of white fine particles according to any one of the aspects <1> to <23>, wherein a volume median particle size ($D_{50}$) of the white fine particles in the dispersion of the white fine particles is preferably not less than 150 nm, more preferably not less than 200 nm, even more preferably not less than 220 nm and further even more preferably not less than 250 nm, and is also preferably not more than 500 nm, more preferably not more than 400 nm and even more preferably not more than 350 nm.

<25> A water-based ink for ink-jet printing which contains the white fine particles produced by the process according to any one of the aspects <1> to (24).

<26> The water-based ink for ink-jet printing according to the aspect <25>, wherein a content of the titanium oxide in the water-based ink is preferably not less than 0.5% by mass, more preferably not less than 1% by mass and even more preferably not less than 2% by mass, and is also preferably not more than 20% by mass, more preferably not more than 17% by mass and even more preferably not more than 15% by mass.

<27> The water-based ink for ink-jet printing according to the aspect <25> or <26>, wherein a content of an organic solvent in the water-based ink is preferably not less than 10% by mass, more preferably not less than 20% by mass and even more preferably not less than 25% by mass, and is also preferably not more than 50% by mass, more preferably not more than 45% by mass and even more preferably not more than 40% by mass.

<28> The water-based ink for ink-jet printing according to any one of the aspects <25> to <27>, wherein a content of water in the water-based ink is preferably not less than 30% by mass, more preferably not less than 35% by mass and even more preferably not less than 40% by mass, and is also preferably not more than 80% by mass, more preferably not more than 70% by mass and even more preferably not more than 60% by mass.

<29> The water-based ink for ink-jet printing according to any one of the aspects <25> to <28>, wherein a pH value of the water-based ink as measured at 20° C. is preferably not less than 5.5, more preferably not less than 6.0 and even more preferably not less than 6.5, and is also preferably not more than 11.0, more preferably not more than 10.0, even more preferably not more than 9.5 and further even more preferably not more than 9.0.

EXAMPLES

In the following Production Examples, Preparation Examples, Examples and Comparative Examples, "%" indicates "% by mass" unless otherwise specified.

(1) Measurement of Number-Average Molecular Weight of Polymer Dispersant

The number-average molecular weight of the polymer dispersant was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using monodisperse polystyrenes having previously known molecular weights as a reference standard substance.

(2) Measurement of Average Primary Particle Size of Titanium Oxide

The average primary particle size of the titanium oxide was determined by the following method. That is, using a transmission electron microscope "JEM-2100" available form JEOL Ltd., 500 primary particles of the titanium oxide were extracted by image analysis to measure their particle sizes and calculate an average value of the thus measured particle sizes as an arithmetical mean particle diameter thereof. Meanwhile, in the case where the respective titanium oxide particles had a major axis diameter and a minor axis diameter, the average primary particle size of the titanium oxide was calculated by using the major axis diameters thereof.

(3) Measurement of Solid Contents of Titanium Oxide Dispersion and Dispersion of White Fine Particles Using an infrared moisture meter "FD-230" available from Kett Electric Laboratory, 5 g of a sample to be measured was dried at a drying temperature of 150° C. under a measuring mode 96 (monitoring time: 2.5 minutes/variation range: 0.05%) to measure a water content (%) of the sample to be measured. The solid content of the sample to be measured was calculated according to the following formula:

Solid Content (%)=100−(Water Content (%) of Sample to be Measured)

(4) Acid Dissociation Exponent (pKa) of Acid Component of Polymer Dispersant

As the acid dissociation exponent (pKa) of the acid component of the polymer dispersant, there was adopted the value of acrylic acid (pKa: 4.26) which is described in The Chemical Society of Japan, Handbook of Chemistry, Pure Chemistry II, Revised 4th Edition, published by MARUZEN Publishing Co., Ltd.

(5) Measurement of Isoelectric Point of Titanium Oxide

After dispersing 0.1 g of titanium oxide in 100 g of ion-exchanged water, 1N HCl was added to the resulting dispersion to control a pH value of the dispersion to 1, thereby obtaining a dispersion of the titanium oxide. The resulting titanium oxide dispersion was charged into a zeta potential/particle size/molecular weight measuring system "ELSZ-1000ZS" available from Otsuka Electrics Co., Ltd., to measure a zeta potential of the dispersion while varying the pH value thereof by a titrator attached to the measuring system. The pH value at which the zeta potential became zero was regarded as an isoelectric point of the titanium oxide.

(6) Measurement of Volume Median Particle Sizes ($D_{50}$) of Particles in Titanium Oxide Dispersion and Dispersion of White Fine Particles Using a laser diffraction/scattering-type particle size distribution measuring apparatus "LA-920" available from HORIBA Ltd., a cell for the measurement was charged with a sample dispersion and then with distilled water to measure a volume median particle size ($D_{50}$) of the particles in the dispersion at a concentration at which an absorbance thereof fell within an adequate range.

(7) pH of Water-Based Ink

The pH value of the ink was measured at 20° C. using a bench-top pH meter "F-71" available from Horiba Ltd., equipped with a pH electrode "6337-10D" available from Horiba Ltd.

Production Example 1 (Production of Polymer Dispersant 1)

A 100 mL four-necked round bottom flask equipped with a thermometer, a 100 mL nitrogen bypass-fitted dropping funnel and a refluxing device was charged with 34 g of acrylic acid, 32 g of styrene, 76 g of methyl ethyl ketone (MEK), 0.3 g of 2,2'-azobis(2,4-dimethylvaleronitrile) "V-65" (tradename) as a polymerization initiator available from Wako Pure Chemical Industries, Ltd., and 3 g of 3-mercaptopropionic acid as a chain transfer agent available from Tokyo Chemical Industry Co., Ltd., and the contents of the flask were mixed with each other using a magnetic stirrer.

The resulting mixture was bubbled with nitrogen for 10 minutes and then heated to 77° C. in a water bath. After reaching a temperature of 77° C., the contents of the flask were allowed to stand at that temperature for 3 hours to complete the reaction therebetween. Thereafter, the resulting reaction solution was charged into 1 L of n-hexane to subject the solution to reprecipitation. The resulting reprecipitated product was then dried at 70° C. under 8 kPa for 8 hours, thereby obtaining a polymer dispersant 1. The results are shown in Table 1.

The resulting polymer dispersant 1 was neutralized with sodium hydroxide until a neutralization degree of the polymer reached 30 mol % to thereby obtain a water dispersion containing 2% by mass of the polymer dispersant 1. When observing the water dispersant of the polymer dispersant 1 under ordinary light, Tyndall phenomenon was recognized therein. Therefore, it was confirmed that the polymer dispersant 1 was in the form of a water-insoluble polymer.

Production Examples 2 and 3 (Production of Polymer Dispersants 2 and 3)

The same procedure as in Production Example 1 was repeated except that the amounts of acrylic acid and styrene were changed as shown in Table 1, thereby obtaining polymer dispersants 2 and 3. The results are shown in Table 1.

TABLE 1

|  |  | Production Example 1 | Production Example 2 | Production Example 3 |
| --- | --- | --- | --- | --- |
| Kind of polymer dispersant |  | 1 | 2 | 3 |
| Composition charged |  |  |  |  |
| (a) Acrylic acid | g | 34 | 20 | 46 |
| (b) Styrene | g | 32 | 46 | 20 |
| MEK | g | 76 | 76 | 76 |
| V-65 | g | 0.3 | 0.3 | 0.3 |
| 3-Mercaptopropionic acid | g | 3 | 3 | 3 |

TABLE 1-continued

|  |  | Production Example 1 | Production Example 2 | Production Example 3 |
| --- | --- | --- | --- | --- |
| Results |  |  |  |  |
| Yield | % | 98 | 99 | 95 |
| pKa of acid component of polymer dispersant | — | 4.26 | 4.26 | 4.26 |
| Acid value of polymer | mgKOH/g | 372 | 217 | 491 |
| Number-average molecular weight | g/mol | 2,400 | 2,600 | 2,100 |

Preparation Examples 1 to 5 and Comparative Preparation Examples 1 and 2 (Preparation of Titanium Oxide Dispersions 1 to 7)

A 200 mL glass beaker was charged with 41 g of ion-exchanged water, 2 g of the respective polymer dispersants shown in Table 2, 0.2 g of sodium hydroxide and 10 g of the respective titanium oxides shown in Table 2, and the contents of the glass beaker were dispersed for 20 minutes using an ultrasonic disperser "Model No. US-3001" available from NISSEI Corporation while stirring with a magnetic stirrer. Thereafter, the resulting dispersion was mixed and dispersed at 20° C. for 8 hours using a beads mill-type disperser "Ultra Apex Mill, Model No. UAM-05" available from Kotobuki Industries Co., Ltd., filled with zirconia beads having a particle size of 1.0 mm as media particles. Then, the resulting mixture was allowed to pass through a 200-mesh wire mesh screen to remove the zirconia beads therefrom, thereby obtaining titanium oxide dispersions 1 to 7 (solid content: 22.9% by mass). The results are shown in Table 2.

The details of the titanium oxides used in the respective Preparation Examples, etc., (as shown in Table 2) are as follows.

R-930: Rutile-type alumina/zinc oxide (Al/Zn)-treated titanium oxide; average primary particle size: 250 nm; available from Ishihara Sangyo Kaisha, Ltd.

JR-405: Rutile-type alumina (Al)-treated titanium oxide; average primary particle size: 210 nm; available from TAYCA Corporation JR: Rutile-type untreated titanium oxide; average primary particle size: 270 nm; available from TAYCA Corporation TR-92: Rutile-type alumina/zirconia (Al/Zr)-treated titanium oxide; average primary particle size: 280 nm; available from Huntsmann Corporation CR-80: Rutile-type alumina/silica (Al/Si)-treated titanium oxide; average primary particle size: 250 nm; available from Ishihara Sangyo Kaisha, Ltd.

TABLE 2

|  |  | Preparation Examples | | | | | Comparative Preparation Examples | |
|---|---|---|---|---|---|---|---|---|
|  |  | 1 | 2 | 3 | 4 | 5 | 1 | 2 |
| Kind of titanium oxide dispersion |  | 1 | 2 | 3 | 4 | 5 | 6 | 7 |
| Composition formulated (g) |  |  |  |  |  |  |  |  |
| Polymer dispersant 1 | g | 2 | 2 | 2 |  |  | 2 | 2 |
| Polymer dispersant 2 | g |  |  |  | 2 |  |  |  |
| Polymer dispersant 3 | g |  |  |  |  | 2 |  |  |
| Sodium hydroxide | g | 0.2 | 0.2 | 0.2 | 0.2 | 0.2 | 0.2 | 0.2 |
| Ion-exchanged water | g | 41 | 41 | 41 | 41 | 41 | 41 | 41 |
| Titanium oxide |  |  |  |  |  |  |  |  |
| R-930 (Al/Zn-treated) | g | 10 |  |  | 10 | 10 |  |  |
| JR-405 (Al-treated) | g |  | 10 |  |  |  |  |  |
| JR (untreated) | g |  |  | 10 |  |  |  |  |
| TR-92 (Al/Zr-treated) | g |  |  |  |  |  | 10 |  |
| CR-80 (Al/Si-treated) | g |  |  |  |  |  |  | 10 |
| pH upon mixing in step 1 | — | 5.5 | 5.6 | 5.5 | 5.7 | 5.4 | 5.8 | 5.6 |
| Isoelectric point (A) of titanium oxide | — | 9.2 | 9.5 | 6.4 | 9.2 | 9.2 | 3.7 | 3.0 |
| pKa (B) of polymer dispersant | — | 4.3 | 4.3 | 4.3 | 4.3 | 4.3 | 4.3 | 4.3 |
| (A) − (B) |  | 4.9 | 5.2 | 2.1 | 4.9 | 4.9 | −0.6 | −1.3 |
| Volume median particle size ($D_{50}$) | nm | 261 | 210 | 205 | 279 | 241 | 240 | 250 |

Examples A1 to A5 and Comparative Examples A1 and A2 (Production of White Fine Particle Dispersions 1 to 7)

A 100 mL two-necked eggplant-shaped flask equipped with a three-way cock and a septum seal was charged with 53 g of the respective titanium oxide dispersions obtained in the aforementioned Preparation Examples and Comparative Preparation Examples and 0.03 g of 4,4'-azobis(4-cyanovaleric acid) "V-501" (tradename) as a water-soluble polymerization initiator available from Wako Pure Chemical Industries, Ltd., and the contents of the flask were bubbled with nitrogen for 10 minutes.

Separately, a 20 mL Hamilton gastight syringe to be fitted to a syringe pump was charged with a mixture of 1 g of styrene (St) and 3 g of methyl methacrylate (MMA), and mounted to the syringe pump.

The aforementioned eggplant-shaped flask was dipped in a water bath at 72° C., and the St/MMA mixture in the syringe was added dropwise at a dropping velocity of 0.9 g/h into the reaction solution in the flask. After completion of the dropwise addition, 2 g of St and 6 g of MMA were charged into the syringe in the syringe pump, and then added dropwise at a dropping velocity of 2.5 g/h into the reaction solution in the flask. After completion of the dropwise addition, the contents of the flask were reacted at 72° C. for 1 hour, and ion-exchanged water was added to the flask to control a solid content of the resulting reaction solution to 30% by mass, thereby obtaining white fine particle dispersions 1 to 7 (solid content: 30% by mass). The results are shown in Table 3.

TABLE 3

|  |  | Examples | | | | | Comparative Examples | |
|---|---|---|---|---|---|---|---|---|
|  |  | A1 | A2 | A3 | A4 | A5 | A1 | A2 |
| Kind of white fine particle dispersion |  | 1 | 2 | 3 | 4 | 5 | 6 | 7 |
| Titanium oxide dispersion |  |  |  |  |  |  |  |  |
| Titanium oxide dispersion 1 | g | 53 |  |  |  |  |  |  |
| Titanium oxide dispersion 2 | g |  | 53 |  |  |  |  |  |
| Titanium oxide dispersion 3 | g |  |  | 53 |  |  |  |  |
| Titanium oxide dispersion 4 | g |  |  |  | 53 |  |  |  |
| Titanium oxide dispersion 5 | g |  |  |  |  | 53 |  |  |
| Titanium oxide dispersion 6 | g |  |  |  |  |  | 53 |  |
| Titanium oxide dispersion 7 | g |  |  |  |  |  |  | 53 |
| Polymerization initiator "V-501" | g | 0.03 | 0.03 | 0.03 | 0.03 | 0.03 | 0.03 | 0.03 |
| First stage |  |  |  |  |  |  |  |  |
| Styrene | g | 1 | 1 | 1 | 1 | 1 | 1 | 1 |
| Methyl methacrylate | g | 3 | 3 | 3 | 3 | 3 | 3 | 3 |
| Second stage |  |  |  |  |  |  |  |  |
| Styrene | g | 2 | 2 | 2 | 2 | 2 | 2 | 2 |
| Methyl methacrylate | g | 6 | 6 | 6 | 6 | 6 | 6 | 6 |
| Mass ratio (mass ratio of components charged) [titanium oxide/polymer component] |  | 41/59 | 41/59 | 41/59 | 41/59 | 41/59 | 41/59 | 41/59 |
| Volume median particle size ($D_{50}$) | nm | 312 | 264 | 261 | 332 | 300 | 281 | 304 |
| Solid content | mass % | 30 | 30 | 30 | 30 | 30 | 30 | 30 |

Comparative Example A3 (Production of White Fine Particle Dispersion 8)

A 1000 mL two-necked eggplant-shaped flask equipped with a three-way cock and a septum seal was charged with 111 g of a titanium oxide colloid "Ti-Nanoxide D/SP" (colloidal anatase particles; untreated titanium oxide; average primary particle size: 15 to 20 nm; solid content: 18%) available from SOLARONIX SA (titanium oxide as a solid component: 20 g; water 91 g), 400 g of ion-exchanged water and 5 g of an anionic polymerizable surfactant "Aqualon KH-10" available from DKS Co., Ltd., and the contents of the flask were stirred for 0.5 hour using a magnetic stirrer. Next, 0.03 g of a water-soluble azo polymerization initiator "V-501" (tradename; 4,4'-azobis(4-carbovaleric acid)) available from Wako Pure Chemical Industries, Ltd., was added to 516 g of the whole amount of the resulting dispersion in the flask, and the contents of the flask were bubbled with nitrogen for 10 minutes, thereby obtaining a reaction solution.

Separately, a 50 mL Hamilton gastight syringe was charged with a monomer mixture of 15 g of styrene, 5 g of dicyclopentanyl methacrylate and 5 g of dodecyl methacrylate, and mounted to a syringe pump.

The aforementioned eggplant-shaped flask was dipped in a water bath at 72° C., and the monomer mixture in the syringe was added dropwise at a dropping velocity of 0.9 g/h into the reaction solution in the flask. After the elapse of 5.5 hours, the dropping velocity of the monomer mixture was increased to 2.5 g/h at which the whole amount of the remaining monomer mixture was added dropwise into the reaction solution in the flask. After completion of the dropwise addition, the contents of the flask were reacted at 72° C. for 1 hour, and ion-exchanged water was added to the flask to control a solid content of the resulting dispersion to 30% by mass, thereby obtaining a white fine particle dispersion 8. It was confirmed that the mass ratio of the titanium oxide to the polymer component (titanium oxide/polymer component) in the white fine particle dispersion 8 was 44/56, and the volume median particle size ($D_{50}$) of the white fine particles was 37 nm.

Examples B1 to B5 and Comparative Examples B1 to B3 (Production of Water-Based Inks 1 to 8)

<Production of Printing Inks>

A glass container was charged with the respective white fine particle dispersions shown in Table 4 and ion-exchanged water, and the contents of the glass container were stirred with a magnetic stirrer for 10 minutes, thereby obtaining a mixture A.

Separately, propylene glycol, "SURFYNOL 104PG50" (acetylene-based nonionic surfactant; propylene glycol solution; active ingredient content: 50%) available from Nissin Chemical Co., Ltd., and "EMULGEN 120" (nonionic surfactant; polyoxyethylene lauryl ether) available from Kao Corporation were respectively charged into a glass container, and the contents of the glass container were stirred for 10 minutes using a magnetic stirrer, thereby obtaining a mixture B.

While stirring the mixture A, the mixture B was added thereto, and the resulting mixture was successively stirred for 1 hour. Thereafter, the obtained dispersion was subjected to filtration treatment through a 5 μm-mesh disposable membrane filter "Minisart" available from Sartorius Inc., thereby obtaining respective water-based inks 1 to 8. The properties of the thus obtained water-based inks are shown in Table 4.

<Evaluation of Inks>

(1) Printing Method

The respective water-based inks obtained in Examples, etc., were loaded into a commercially available ink-jet printer "Model No. GX-2500" (piezoelectric type) available from Ricoh Co., Ltd., and printing of an A4 size solid image (monochrome) was carried out on a polyester film "LUMIRROR T60" (thickness: 75 μm; water absorption: 2.3 g/m$^2$) available from Toray Industries Inc., at 23° C. and a relative humidity of 50% under the printing condition of "glossy coated paper; clean; no color matching". After completion of the printing, the resulting printed material was heated and dried on a hot plate at 60° C. for 10 minutes.

(2) Hiding Power Rate of Printed Material

The printed image formed on the resulting printed material was subjected to measurement of a color difference ΔE thereof on a whiteness standard plate (visual density=0.05) and a blackness standard plate (visual density=1.86) as a background using a spectrophotometric color difference meter "SE-2000" available from Nippon Denshoku Industries Co., Ltd. The color difference ΔE is preferably not more than 10% and more preferably not more than 6%.

(3) Rub Fastness of Printed Material

The resulting printed material was subjected to a rub fastness test in which the printed image formed on the printed material was rubbed with a cotton "BEMCOT M-3" available from Asahi Kasei Corp., as a friction material using "Sutherland-type Ink Rub Tester Model No. AB-201" available from Tester Sangyo Co., Ltd., under a load of 2000 g 100 times (by reciprocating motions). The rubbed printed image was visually observed to count and record the number of times of the rubbing motions required until an underlying texture of the polyester film beneath the printed image was exposed outside. The larger the number of times of the rubbing motions, the more excellent the rub fastness of the printed image.

(4) Water Resistance of Printed Material

The mass of the resulting printed material was measured, and then an absorbent cotton into which 20 g of water was impregnated was placed on the printed material, and allowed to stand as such for 1 hour. Then, the absorbent cotton was reciprocatively moved over the printed material 10 times while applying a load of 50 g thereto. Thereafter, the printed material was allowed to stand in a vacuum dryer maintained at 40° C. for 12 hours, and then the mass of the printed material was measured to calculate a difference value (mg) between the masses before and after the water resistance test. The smaller the difference value, the more excellent the water resistance of the printed material.

TABLE 4

|  |  | Examples | | | | | Comparative Examples | | |
| --- | --- | --- | --- | --- | --- | --- | --- | --- | --- |
|  |  | B1 | B2 | B3 | B4 | B5 | B1 | B2 | B3 |
| Kind of water-based ink |  | 1 | 2 | 3 | 4 | 5 | 6 | 7 | 8 |
| Composition formulated (g) |  |  |  |  |  |  |  |  |  |
| White fine particle dispersion |  |  |  |  |  |  |  |  |  |
| White fine particle dispersion 1 | g | 8 |  |  |  |  |  |  |  |
| White fine particle dispersion 2 | g |  | 8 |  |  |  |  |  |  |
| White fine particle dispersion 3 | g |  |  | 8 |  |  |  |  |  |
| White fine particle dispersion 4 | g |  |  |  | 8 |  |  |  |  |
| White fine particle dispersion 5 | g |  |  |  |  | 8 |  |  |  |
| White fine particle dispersion 6 | g |  |  |  |  |  | 8 |  |  |
| White fine particle dispersion 7 | g |  |  |  |  |  |  | 8 |  |
| White fine particle dispersion 8 | g |  |  |  |  |  |  |  | 8 |
| Solvent    Propylene glycol | g | 12 | 12 | 12 | 12 | 12 | 12 | 12 | 12 |
| Surfactant    "SURFYNOL 104PG50" | g | 0.4 | 0.4 | 0.4 | 0.4 | 0.4 | 0.4 | 0.4 | 0.4 |
|    "EMULGEN 120" | g | 0.4 | 0.4 | 0.4 | 0.4 | 0.4 | 0.4 | 0.4 | 0.4 |
| Ion-exchanged water | g | 13 | 13 | 13 | 13 | 13 | 13 | 13 | 13 |
| Content of titanium oxide in ink | mass % | 3 | 3 | 3 | 3 | 3 | 3 | 3 | 3 |
| pH of ink | — | 8.5 | 8.5 | 8.6 | 8.6 | 8.5 | 8.4 | 8.2 | 8.6 |
| Evaluation results |  |  |  |  |  |  |  |  |  |
| Hiding power rate (color difference ΔE) | % | 0 | 4 | 2 | 5 | 7 | 41 | 63 | 21 |
| Rub fastness | Number of times of rubbing | >100* | 85 | 97 | 76 | 91 | 36 | 69 | 47 |
| Water resistance | g | 0 | 2 | 6 | 4 | 17 | 91 | 21 | 73 |

Note
*No texture of the polyester film was exposed even when rubbed 100 times

From Table 4, it was confirmed that the water-based inks obtained in Examples B1 to B5 were excellent in hiding power rate, rub fastness and water resistance as compared to the water-based inks obtained in Comparative Examples B1 and B2 in which the value of [(isoelectric point (A) of titanium oxide)−(pKa (B) of polymer dispersant)] was less than 0 (refer to Tables 2 and 3) and the water-based ink obtained in Comparative Example B3 in which the volume median particle size ($D_{50}$) of the particles contained therein was less than 150 nm.

INDUSTRIAL APPLICABILITY

In accordance with the present invention, it is possible to provide a process for producing a dispersion of white fine particles from which a white ink that is capable of exhibiting excellent hiding power, rub fastness and water resistance even when printed on a low-water absorbing printing medium can be obtained by incorporating the dispersion of white fine particles into the ink; and a water-based ink for ink-jet printing which contains the white fine particles.

The invention claimed is:

1. A process for producing a dispersion of white fine particles, comprising the following steps 1 and 2:
    Step 1: mixing titanium oxide and a polymer dispersant comprising an acid component at a pH value that is not less than an acid dissociation exponent (pKa) of at least a part of the acid component of the polymer dispersant to thereby obtain a titanium oxide dispersion,
    in which an isoelectric point (A) of the titanium oxide and the acid dissociation exponent (pKa) (B) of the polymer dispersant satisfy a relationship represented by the formula:

$A-B \geq 2.0$, the polymer dispersant comprises a constitutional unit derived from a hydrophobic monomer, and a volume median particle size ($D_{50}$) of particles in the titanium oxide dispersion is not less than 150 nm and not more than 500 nm; and
    Step 2: adding a polymerizable monomer to the titanium oxide dispersion obtained in the step 1 to subject the polymerizable monomer to polymerization reaction to encapsulate the titanium oxide with a polymer component, thereby obtaining the dispersion of the white fine particles.

2. The process for producing a dispersion of white fine particles according to claim 1, wherein an average primary particle size of the titanium oxide is not less than 40 nm and not more than 400 nm.

3. The process for producing a dispersion of white fine particles according to claim 1, wherein the titanium oxide is untreated, or treated with at least one material selected from the group consisting of alumina, silica and zinc oxide.

4. The process for producing a dispersion of white fine particles according to claim 1, wherein the isoelectric point of the titanium oxide is not less than 4.0.

5. The process for producing a dispersion of white fine particles according to claim 1, wherein the acid dissociation exponent (pKa) of the acid component of the polymer dispersant is not more than 5.5.

6. The process for producing a dispersion of white fine particles according to claim 1, wherein the lowest acid dissociation exponent (pKa) of at least a part of the acid component of the polymer dispersant is not less than 1.

7. The process for producing a dispersion of white fine particles according to claim 1, wherein the acid component of the polymer dispersant is a carboxylic acid.

8. The process for producing a dispersion of white fine particles according to claim 7, wherein the acid component of the polymer dispersant is (meth)acrylic acid.

9. The process for producing a dispersion of white fine particles according to claim 1, wherein the polymerizable monomer is at least one monomer selected from the group consisting of a (meth)acrylic monomer and an aromatic group-containing monomer.

10. The process for producing a dispersion of white fine particles according to claim 1, wherein a mass ratio of the titanium oxide to a polymer component [titanium oxide/polymer component] is not less than 20/80 and not more than 80/20.

11. The process for producing a dispersion of white fine particles according to claim 1, wherein a monomer constituting the constitutional unit derived from the hydrophobic monomer in the polymer dispersant is at least one monomer selected from the group consisting of an alkyl (meth)acrylate and an aromatic group-containing monomer.

12. The process for producing a dispersion of white fine particles according to claim 1, wherein an acid value of the polymer dispersant is not less than 100 mgKOH/g and not more than 700 mgKOH/g.

13. The process for producing a dispersion of white fine particles according to claim 1, wherein the mixing in the step 1 is conducted at a pH value that is not less than the highest acid dissociation exponent (pKa) of the acid component of the polymer dispersant.

14. The process for producing a dispersion of white fine particles according to claim 1, wherein in the step 1, the titanium oxide and the polymer dispersant are mixed by subjecting a mixture comprising the titanium oxide, the polymer dispersant and an aqueous medium to dispersion treatment.

15. The process for producing a dispersion of white fine particles according to claim 1, wherein the pH value at which the titanium oxide and the polymer dispersant are mixed with each other is not less than 4.6.

16. The process for producing a dispersion of white fine particles according to claim 1, wherein the volume median particle size ($D_{50}$) of particles in the titanium oxide dispersion is not less than 200 nm and not more than 400 nm.

17. The process for producing a dispersion of white fine particles according to claim 1, wherein a mass ratio of the polymerizable monomer to the titanium oxide [polymerizable monomer/titanium oxide] is not less than 0.1 and not more than 2.0.

18. The process for producing a dispersion of white fine particles according to claim 1, wherein a polymerization temperature is not lower than 50° C. and not higher than 90° C.

* * * * *